US008979464B2

(12) United States Patent
Machida et al.

(10) Patent No.: US 8,979,464 B2
(45) Date of Patent: Mar. 17, 2015

(54) PRODUCTION FACILITY, AND PRODUCTION SYSTEM

(75) Inventors: Takuya Machida, Iwata (JP); Shigeki Matsushita, Iwata (JP); Shinya Inui, Iwata (JP); Hiroshi Hatano, Iwata (JP)

(73) Assignee: NTN Corporation, Osaka (JP)

( * ) Notice: Subject to any disclaimer, the term of this patent is extended or adjusted under 35 U.S.C. 154(b) by 668 days.

(21) Appl. No.: 13/058,374

(22) PCT Filed: Aug. 31, 2009

(86) PCT No.: PCT/JP2009/065178
§ 371 (c)(1),
(2), (4) Date: Feb. 10, 2011

(87) PCT Pub. No.: WO2010/026942
PCT Pub. Date: Mar. 11, 2010

(65) Prior Publication Data
US 2011/0135429 A1    Jun. 9, 2011

(30) Foreign Application Priority Data

Sep. 5, 2008 (JP) ................................. 2008-228396
Aug. 28, 2009 (JP) ................................. 2009-198339

(51) Int. Cl.
*B23P 21/00* (2006.01)
*B25J 19/06* (2006.01)
*B23Q 37/00* (2006.01)

(52) U.S. Cl.
CPC .............. *B23P 21/00* (2013.01); *B23Q 37/007* (2013.01); *B23P 21/004* (2013.01); *B25J 19/06* (2013.01)
USPC ............................ 414/222.13; 29/430; 29/791

(58) Field of Classification Search
CPC ........ B23P 21/004; B23Q 41/02; B23Q 41/08
USPC .................. 414/222.01–222.13; 29/559, 564, 29/564.1, 711, 742, 759, 760, 783, 791
See application file for complete search history.

(56) References Cited

U.S. PATENT DOCUMENTS

| 4,616,886 | A  | * | 10/1986 | Teramachi ..................... 384/45 |
| 6,736,149 | B2 | * | 5/2004  | Biberger et al. ................ 134/66 |
| 6,930,050 | B2 | * | 8/2005  | Kim et al. ..................... 438/716 |
| 7,435,046 | B2 | * | 10/2008 | Kiaie et al. ............... 414/223.01 |

(Continued)

FOREIGN PATENT DOCUMENTS

| JP | 60-4328  | 1/1985 |
| JP | 2-61530  | 5/1990 |

(Continued)

OTHER PUBLICATIONS

International Preliminary Report on Patentability and Written Opinion of the International Searching Authority issued Apr. 21, 2011 in International (PCT) Application No. PCT/JP2009/065178.

(Continued)

*Primary Examiner* — Saul Rodriguez
*Assistant Examiner* — Ronald Jarrett
(74) *Attorney, Agent, or Firm* — Wenderoth, Lind & Ponack, L.L.P.

(57) ABSTRACT

Provided is a production facility which allows a worker to perform manual works such as restoration, setting change, and manufacturing, without entering an action area of a robot. The production facility includes a casing, a swaging as a dedicated device housed in the casing, for performing swaging using a boot band, and an internal transfer device. A human work area on the front side of the production facility and an action area of a transfer robot on the back side of the production facility are separated by the swaging device and the casing. The worker positioned on the front side of the production facility operates swaging device without entering the action area of the transfer robot so that the transfer robot need not be stopped when the work is performed.

6 Claims, 4 Drawing Sheets

(56) References Cited

U.S. PATENT DOCUMENTS

2003/0053893 A1* 3/2003 Matsunaga et al. ........... 414/217
2008/0085173 A1* 4/2008 van der Meulen ....... 414/222.07
2008/0085174 A1* 4/2008 Rebstock ................. 414/222.12

FOREIGN PATENT DOCUMENTS

| JP | 3-123635 | 12/1991 | | |
|----|----------|---------|---|---|
| JP | 2007-268622 | 10/2007 | | |
| JP | 2008-023628 | 2/2008 | | |
| JP | 2008-168357 | * | 7/2008 | ............. B23Q 41/08 |

OTHER PUBLICATIONS

International Search Report issued Sep. 29, 2009 in International (PCT) Application No. PCT/JP2009/065178.

* cited by examiner

PRODUCTION FACILITY, AND PRODUCTION SYSTEM

TECHNICAL FIELD

The present invention relates to a production facility and a production system using a transfer robot.

BACKGROUND ART

Conventionally, industrial robots have been introduced into production systems for various products. As a production system including the industrial robots, a line production system which has a plurality of assembly robots arranged along a conveyor is often adopted, and the production system of this kind is suited for high-volume, low-variety production.

In recent years, product producing style has been gradually shifted from high-volume, low-variety production to low-volume, high-variety production, and correspondingly a cell production system has been gradually adopted. As the cell production system, there has been proposed a system including a plurality of assembly robots arranged adjacent to each other and a plurality of transfer devices each for transferring a product between the assembly robots (for example, see Patent Literature 1).

CITATION LIST

Patent Literature 1: JP 2008-23628 A

SUMMARY OF INVENTION

Technical Problem

When an industrial robot is adopted for a production system, according to robot safety standards, a separation of an action area of the industrial robot and a human work area is required. Therefore, the conventional production system includes a dedicated safety wall surrounding the action area of the industrial robot. As a result, entry of a person to the action area of the industrial robot is prohibited while the production system is in operation.

However, in the production system having the above-mentioned configuration, in a case of production system abnormality, the industrial robot is completely stopped before a worker enters the action area of the industrial robot through a door provided on the safety wall to perform a restoration work, which inconveniently makes the work laborious and time-consuming. In addition, the complete stop of the industrial-robot causes the complete stop of the production system, thereby inconveniently leading to decrease in production efficiency.

Further, when a so-called setup change, including a setting change of a working device, is made along with a product change, the worker is required to enter the action area of the industrial robot to perform the changing work. Thus, the industrial robot needs to be completely stopped, which makes the work laborious and time-consuming, and inconveniently leads to decrease in production efficiency.

Further, when an automatic work by the industrial robot and a manual work coexist in a production step, it is necessary to install a device and tool for use in the manual work outside the action area of the industrial robot, temporarily take the product out of the action area of the robot and perform the manual work, and subsequently bring the product back to the action area of the robot. Therefore, the device configuration becomes large-scale, which inconveniently leads to larger production area and decrease in production efficiency due to time and labor of taking the product in and out between the action area of the robot and the human work area.

Thus, an object of the present invention is to provide a production facility which allows a worker to perform manual works such as restoration, setting change, and manufacturing, without entering an action area of a robot.

Solution to Problem

A production facility according to the present invention provided in order to solve the above-mentioned problems includes: a transfer robot; a product access position that allows at least one of reception and handoff of a product with respect to the transfer robot, with the transfer robot being located on a back side of the production facility; and an internal transfer device for transferring the product between the product access position and a work position forward of the product access position, in which a region ranging from a front side of the production facility, which is outside an action area of the transfer robot, to the work position defines a human work space.

According to the production facility having the above-mentioned configuration, the product transferred by the transfer robot is received at the access position, and transferred from the access position to the work position by the internal transfer device. An automatic work by, for example, a dedicated device for performing a predetermined step or a manual work is performed on the product transferred to the work position. When the work on the product is finished, the product is conveyed from the work position to the access position by the internal transfer device, and delivered to the transfer robot at the access position and then transferred to the next step.

Here, in the case of production system abnormality due to failure in the device of the production facility or the like, a restoration work can be performed from the front side of the production facility through the human work space formed from the front side, which is outside the action area of the transfer robot, to the work position. That is, the worker can perform the restoration work without entering the action area of the transfer robot, so that the transfer robot need not be stopped. Therefore, the transfer robot can continue to be in operation for other production facilities, with the result that decrease in production efficiency of the production system can be prevented. Further, the restoration work can be easily and quickly performed because the transfer robot need not be stopped.

Further, when it becomes necessary to perform a setting change work to a predetermined device of the production facility, including the case of changing products to be produced in the production facility, the setting change work can be performed by the worker from the front side of the production facility through the human work space without entering the action area of the transfer robot. Therefore, the transfer robot need not be stopped, so that decrease in production efficiency of the production system can be prevented and the setting change work can be easily and quickly performed.

Further, when the step performed in the production facility includes a manual work, the worker can perform the manual work from the front side of the production facility through the human work space on the product transferred to the work position. Therefore, it is unnecessary to install a device and tool for use in the manual work outside the action area of the industrial robot, temporarily take the product out of the action area of the robot and perform the manual work, and subsequently bring the product back to the action area of the robot.

As a result, it is possible to reduce the size of the production area and increase production efficiency.

In this specification, the product means both a product in process and a finished product.

In the above-mentioned production facility, the product access position may include a first access position for receiving the product and a second access position for handing off the product.

With such a configuration, reception and handoff of the product with respect to the transfer robot can be performed at different positions.

When the above-mentioned production facility includes the dedicated device for performing the predetermined work, the action area of the transfer robot on the back side of the production facility and a human work area on the front side of the production facility may be separated from each other by one of the dedicated device itself and mounting support columns or a casing of the dedicated device.

With such a configuration, when the production facility includes a dedicated device for performing, for example, one of the production steps, separating the action area of the transfer robot and the human work area from each other by one of the dedicated device itself and the mounting support columns or the casing allows the dedicated device itself and the mounting support columns or the casing to serve as a partition. Therefore, it is possible to separate the action area of the transfer robot from the human work area merely by installing the production facility, without providing a partition separately from the production facility.

When the above-mentioned production facility includes the dedicated device for performing the predetermined work, the internal transfer device may be disposed below the dedicated device. With such a configuration, it is possible to contain the dedicated device and the internal transfer device in a compact space, and to make the human work space formed from the human work area to the dedicated device have an appropriate height for the work.

Further, when the above-mentioned production facility includes the dedicated device for performing the predetermined work, the action area of the transfer robot on the back side of the production facility and the human work area on the front side of the production facility may be separated from each other by a dedicated partition connected to the dedicated device.

With such a configuration, when the production facility includes the dedicated device, it is possible to provide a partition in the production facility by connecting the dedicated partition to the top of the dedicated device, even when the dedicated device does not have a top unit, for example. In this way, in the case of a relatively compact dedicated device, it is possible to separate the action area of the transfer robot from the human work area by providing the dedicated partition in an open space in the production facility, without separately providing a partition. The dedicated partition may be provided in addition to the mounting support columns and the casing described above.

Further, the present invention provides a production system including a plurality of the production facilities described above, in which one or a plurality of the transfer robots and the plurality of the production facilities surrounding the one or a plurality of the transfer robots are arranged to form a cell production system.

With such a production system, a cell production system is obtained, in which the one or the plurality of the transfer robots transfer the product to each of the production facilities. Here, the transfer robot is surrounded by the plurality of production facilities, so that it is possible to separate the action area of the transfer robot from the human work area without separately providing a safety fence. Thus, the restoration works, the changing works, and the manual works in the production steps can be performed without stopping the transfer robot, to thereby successfully achieve high production efficiency and to form a compact production system.

Further, the present invention provides a production system including a plurality of the production facilities described above, in which a plurality of the transfer robots are arranged between a first line having a part of the plurality of the production facilities aligned in a linear fashion and a second line opposed to the first line and having another part of the plurality of the production facilities aligned in a linear fashion.

With such a production system, a linear-type production system is obtained, in which the plurality of the transfer robots transfer the product to each of the production facilities in the first and second lines. Here, the transfer robots are arranged between the two lines each having the plurality of the production facilities, so that it is possible to separate the action area of the transfer robots from the human work area without separately providing a safety fence. Thus, the restoration works, the changing works, and the manual works in the production steps can be performed without stopping the transfer robot, to thereby successfully achieve high production efficiency and to form a compact production system.

In the production system described above, at least one of the plurality of the production facilities may be replaced by an entrance door to the action area of the transfer robot.

In this way, in a case of maintenance work of the transfer robot, for example, the worker can easily going into and out of the action area of the transfer robot and the human work area through the entrance door.

Advantageous Effects of Invention

According to the present invention, the worker positioned on the front side of the production facility can perform the restoration work on the predetermined device of the production facility, the changing work on the predetermined device of the production facility, and the manual work on the product at the work position, without entering the action area of the transfer robot on the back side of the production facility. Thus, the transfer robot need not be stopped during each work, with the result that production efficiency can be increased. Moreover, neither the safety fence nor the partition need be provided separately from the production facility, so that it is possible to reduce the size of the production area.

DESCRIPTION OF EMBODIMENT

Figure 1:
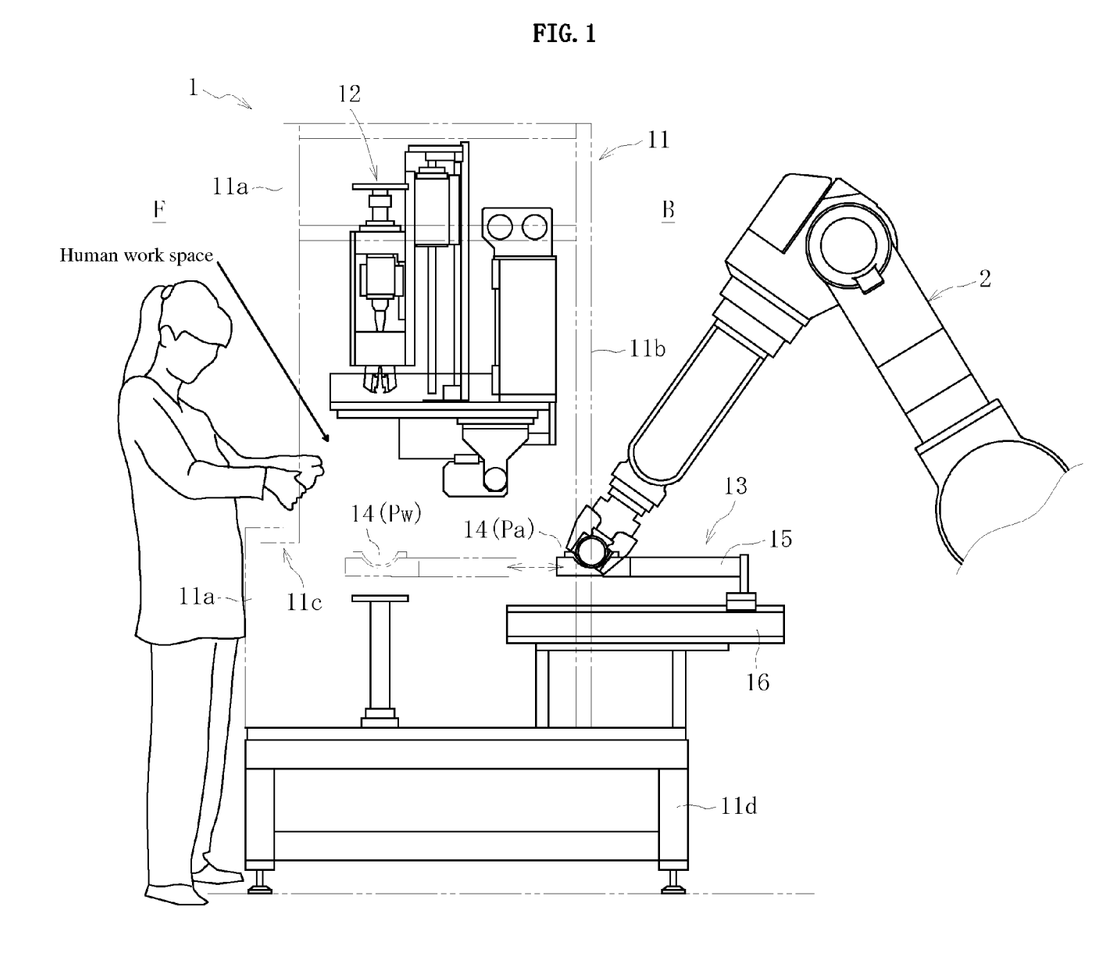
FIG. 1 is a schematic cross-sectional view illustrating a production facility according to an embodiment of the present invention viewed from one side.
Figure 2:
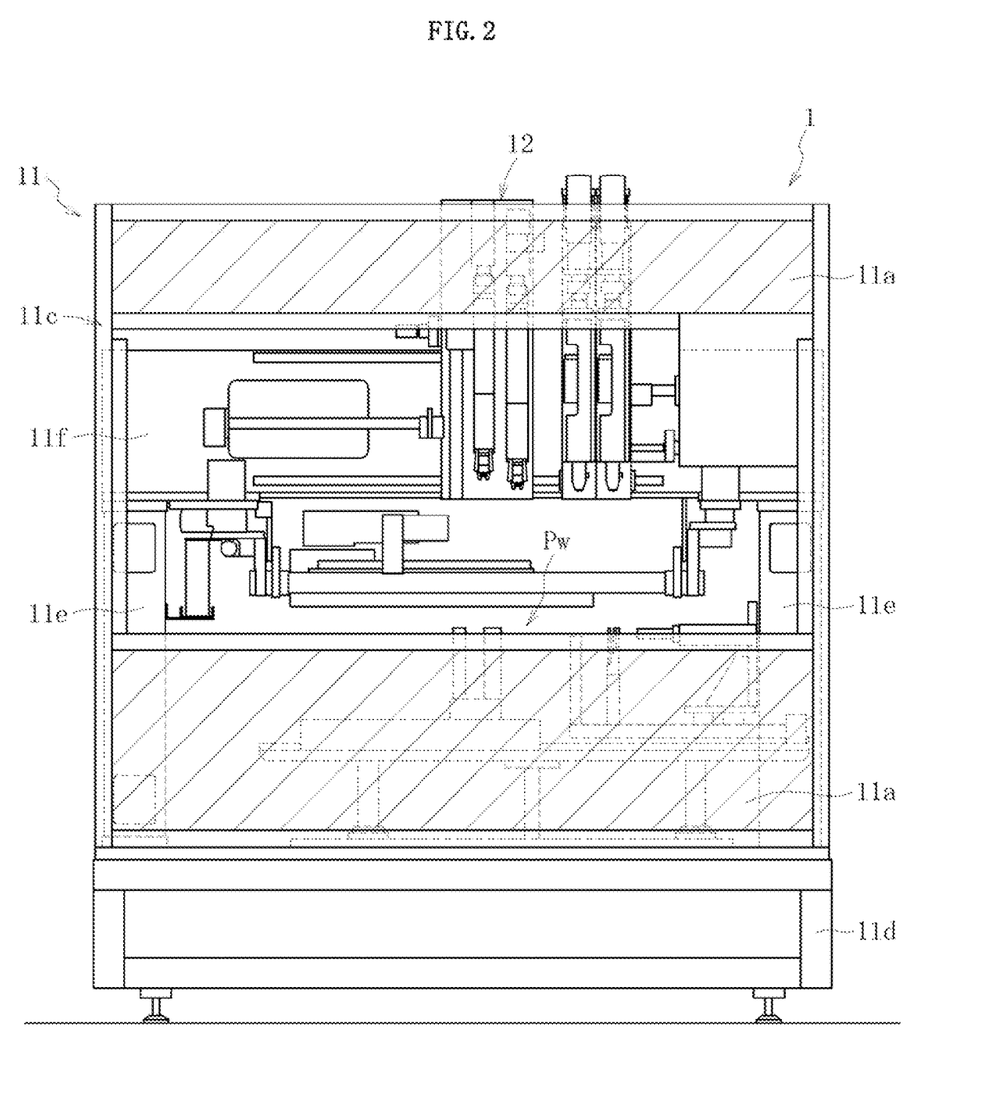
FIG. 2 is a schematic front view illustrating the production facility according to an embodiment of the present invention.

FIG. 1 is a schematic cross-sectional view illustrating a production facility 1 according to an embodiment of the present invention viewed from one side, and FIG. 2 is a schematic front view illustrating the production facility 1.

The production facility 1 is used in a constant velocity universal joint assembling line, for performing a step of fixing a boot to a constant velocity universal joint. The production facility 1 includes a casing 11, a swaging device 12 as a dedicated device housed in the casing 11, for swaging (permanent swaging) using a boot band, and an internal transfer device 13 disposed below the swaging device 12. The swaging device 12 is a device which is operated by worker manipulation, and the worker performing a manual work is intended to work on the front side of the production facility 1. On the other hand, a transfer robot 2 for delivering products with respect to the production facility 1 is provided on the back side of the production facility 1.

As illustrated in FIG. 1, the casing 11 is constructed to extend from a human work area F on the front side of the production facility 1 to an action area B of the transfer robot 2. The casing 11 includes, as illustrated in FIGS. 1 and 2, a bottom frame 11d installed on a floor surface, and panel mounting support column 11c and device mounting support columns 11e vertically arranged on the bottom frame 11d. Front side panels 11a, 11a are mounted on the front side (on the left of FIG. 1) of the panel mounting support column 11c so as to be spaced away from each other on the upper part and the lower part thereof respectively, and a back side panel 11b is mounted on the back side (on the right of FIG. 1) of the panel mounting support column 11c. The front side panels 11a and the back side panel 11b (partially) cover the swaging device 12 and the internal transfer device 13 housed in the casing 11. As a result, the worker working on the front side of the production facility 1 is protected from contacting a drive mechanism of the swaging device 12 or the internal transfer device 13. As illustrated in FIG. 2, the device mounting support columns 11e are vertically arranged on both ends of the production facility 1 in its width direction, and the swaging device 12 as the dedicated device is supported on a device mounting frame 11f provided between the device mounting support columns 11e, 11e.

The internal transfer device 13 is disposed below the casing 11. The internal transfer device 13 includes a placement part 14 on which a product is placed and a support part 15 for supporting the placement part 14. The placement part 14 and the support part 15 are configured to be driven to reciprocate along a rail 16 which extends in the fore and aft direction (left and right direction of FIG. 1) of the production facility 1. The placement part 14 is transferred between an access position Pa in which the transfer robot 2 delivers the product with respect to the placement part 14 and a work position Pw in which a worker performs the manual work. In FIG. 1, 14(Pa) indicates the placement part 14 located at the access position Pa, and 14(Pw) indicates the placement part 14 located at the work position Pw.

The transfer robot 2 installed on the back side of the production facility 1 is an articulated-arm robot for transferring a product with respect to other production facilities constituting a production system. The action area B of the transfer robot 2 is set to be backward of the access position Pa of the production facility 1.

The swaging device 12 is used for performing permanent swaging the boot band which is used in manual and temporary swaging by the worker. The worker is positioned in the human work area F on the front side of the production facility 1, so that the worker inserts his/her hands through an opening between the upper and lower front side panels 11a, 11a mounted on the casing 11 to temporarily swage the constant velocity universal joint transferred to the work position Pw by using the boot band. The work position Pw is in the human work area F separated from the action area B of the transfer robot 2. With this arrangement, the swaging device 12 of the production facility 1 separates the action area B of the transfer robot 2 and the human work area F. A control part of the swaging device 12 is accessible by the worker inserting his/her hands through the opening between the upper and lower front side panels 11a, 11a. Thus, it is possible to perform a setting change work of the swaging device 12 by the worker inserting his/her hands through the opening between the front side panels 11a, 11a.

The swaging device 12 is disposed in a top unit of the production facility 1, and the internal transfer device 13 is disposed in a bottom unit of the production facility 1.

In the production facility 1 having the above-mentioned configuration, the product transferred by the transfer robot 2 from another production facility (not shown) is placed on the placement part 19 (Pa) of the internal transfer device 13 at the access position Pa. When the product is placed on the placement part 14 (Pa), the internal transfer device 13 is driven to transfer the product from the access position Pa to the work position Pw. The worker manually and temporarily swages the boot band for the product transferred to the work position Pw in the human work area F. After the manual work, the swaging device 12 is operated to perform permanent swaging the boot band, to thereby fix the boot to the constant velocity universal joint. When the operation of the swaging device 12 is completed and the product is brought back to the placement part 14(Pw) at the work position Pw, the internal transfer device 13 is driven to transfer the product from the work position Pw to the access position Pa. The product transferred to the access position Pa in the action area B of the transfer robot 2 is delivered to the transfer robot 2, and then transferred to another production facility.

In this way, in the step of swaging the boot for the constant velocity universal joint by the production facility 1, the worker performing the manual work can perform the work from the front side of the production facility 1 on the product transferred to the work position Pw. Thus, unlike the conventional production facility, it is unnecessary to provide a large-scale configuration to take the product out of the action area of the transfer robot and perform the swaging step using the swaging device involving manual work, and subsequently bring the product back to the action area of the robot. As a result, according to the production facility 1 of this embodiment, t is possible to reduce the size of the production system and increase production efficiency.

Now, in a case of failure of the swaging device 12 of the production facility 1, a restoration work, such as repair, of the swaging device 12 can be performed from the human work area F on the front side of the production facility 1. Specifically, the worker in charge of restoration opens the upper front side panel 11a mounted to the casing 11 and repairs the swaging device 12 from the human work area F. That is, a human work space is formed from the human work area F to the swaging device 12. In this way, the production facility 1 of the present invention allows the worker to perform the restoration work on the swaging device 12 without entering the action area B of the transfer robot 2, so that the transfer robot 2 need not be stopped. Therefore, the transfer robot 2 can continue transfer operation to another production facility, with the result that decrease in production efficiency of the production system can be prevented. Further, the worker in charge of restoration can easily and quickly perform the restoration work because the transfer robot 2 need not be stopped.

In addition, when the kind of constant velocity universal joint which is permanently swaged the boot band is to be changed, in order to make a setup change, the worker is required to change the setting of the swaging device 12: Here, as described above, the control part of the swaging device 12 is accessible by the worker inserting his/her hands through the opening between the upper and lower front side panels 11a, 11a, and thus the setting change work for the swaging device 12 can be performed from the human work area F on the front side. In this way, the worker can perform the setting change work without entering the action area B of the transfer robot 2, so that the transfer robot 2 need not be stopped, with the result that decrease in production efficiency of the production system can be prevented. Further, the worker can easily and quickly perform the setting change work because the transfer robot 2 need not be stopped.

Although the production facility 1 described above has the swaging device 12 as the dedicated device provided in the top unit, the production facility 1 may be configured to have a dedicated device for a predetermined step provided only on the bottom unit. In this case, it is preferred to install a dedicated partition, which is connected to the dedicated device in the bottom unit, at a position corresponding to the top unit. This is because the dedicated partition allows to separate the action area B of the transfer robot 2 located on the bask side of the production facility 1 and the human work area F located on the front side of the production facility 1, without separately installing a partition instead of the production facility 1.

In addition, although the production facility 1 as described above is configured to cause the product to be delivered between the internal transfer device 13 and the transfer robot 2 at the single access position Pa, the production facility 1 may be provided with a first access position for reception and a second access position for handoff separate from each other. In this case, it is necessary to separately provide a feeding internal transfer device for transferring the product received at the first access position for reception to the work position Pw and a discharging internal transfer device for transferring the product from the work position Pw to the second access position for handoff. However, it is possible to simultaneously perform the product feeding operation and the product discharging operation, thereby accelerating the cycle time.

Figure 3:
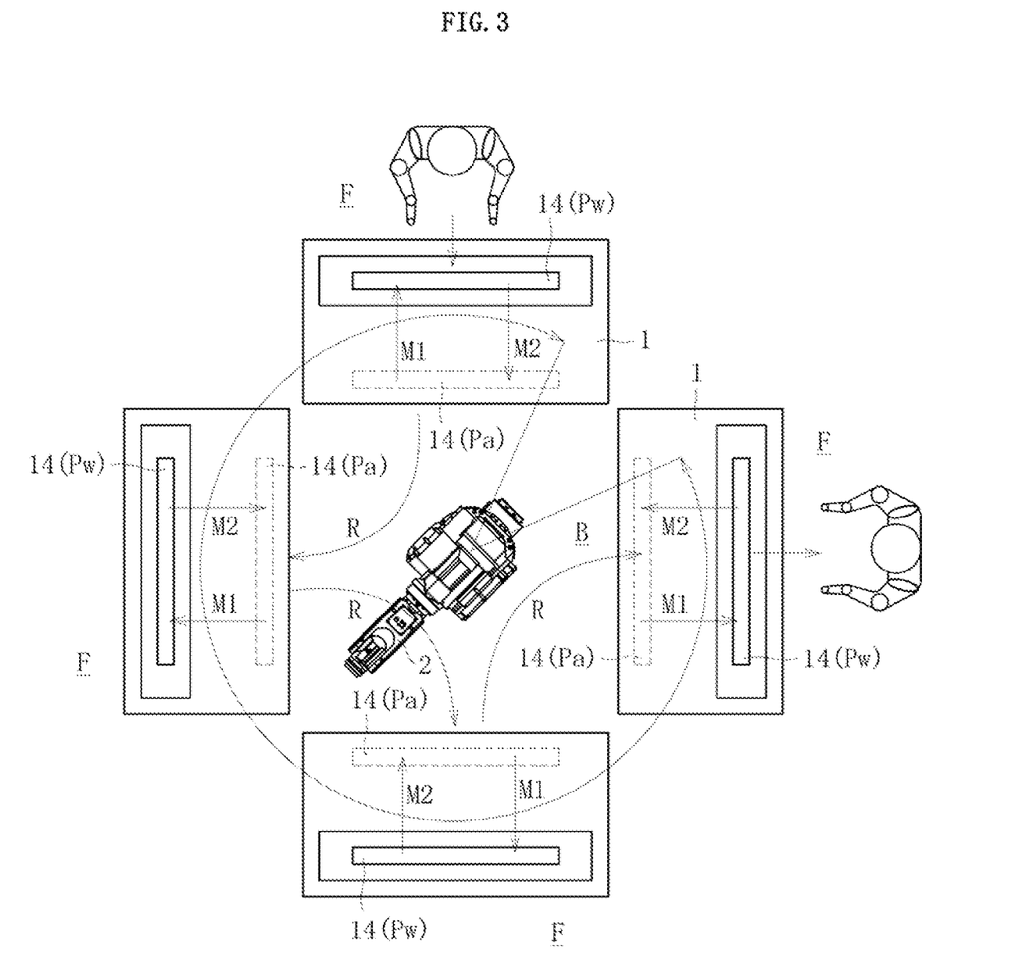
FIG. 3 is a plan view illustrating a production system according to an embodiment of the present invention.

FIG. 3 is a plan view illustrating the production system of the embodiment of the present invention. The production system is a cell production system including four production facilities 1 of the embodiment described above. In the embodiment of the production system illustrated in FIG. 3, the parts identical to those of the embodiment of the production facility 1 illustrated in FIG. 1 are denoted by the same reference symbols as those in FIG. 1 to omit detailed descriptions thereof.

The production system includes one transfer robot 2 for transferring the product and four production facilities 1 surrounding the transfer robot 2. The four production facilities 1 are arranged with their back faced to the transfer robot 2, and the action area B of the transfer robot 2 is set within an area surrounded by each of the production facilities 1. The four production facilities 1 are set to sequentially perform a series of steps in a counterclockwise direction, each including a device dedicated to each step. An worker for performing the manual work with respect to the operation of each production facility 1 is positioned in the human work area F on the front side of each production facility 1. The action area B of the transfer robot 2 is formed into a sector having an obtuse center angle as illustrated in FIG. 3, with the access positions Pa of the placement parts 14 being located at the periphery of the action area B.

In the production system, the transfer robot 2 conveys the product between the successive production facilities 1 as indicated by an arrow R. The product conveyed by the transfer robot 2 is placed on the placement part 14 at the access position Pa, and then conveyed to the work position Pw by the operation of the internal transfer device 13 (not shown) as indicated by an arrow M1. At the work position Pw in the human work area F, the manual work or one of various operations by the dedicated devices is performed. The product that has undergone a predetermined step is conveyed to the access position Pa by the operation of the internal transfer device 13 indicated by an arrow M2, and subsequently transferred to the next production facility 1 by the transfer robot 2. The action area B of the transfer robot 2 and the human work area F are separated from each other by the dedicated device or casing (not shown) of the production facility 1.

According to the production system having the above-mentioned configuration, the transfer robot 2 is surrounded by the plurality of production facilities 1, so that it is possible to separate the action area B of the transfer robot 2 from the human work area F without separately providing a safety fence. Thus, the restoration works, the changing works, and the manual works in the production steps can be performed without stopping the transfer robot 2, to thereby successfully achieve high production efficiency and to form the compact production system. Note that, although the embodiment described above is the cell production system constituted by one transfer robot 2 and a plurality of (four) production facilities 1 surrounding the transfer robot 2, it is possible to constitute the cell production system by a plurality of transfer robots 2 and a plurality of production facilities 1 surrounding the transfer robots 2. Even in this case, a similar effect to that of the production system as illustrated in FIG. 3 is obtained.

Figure 4:
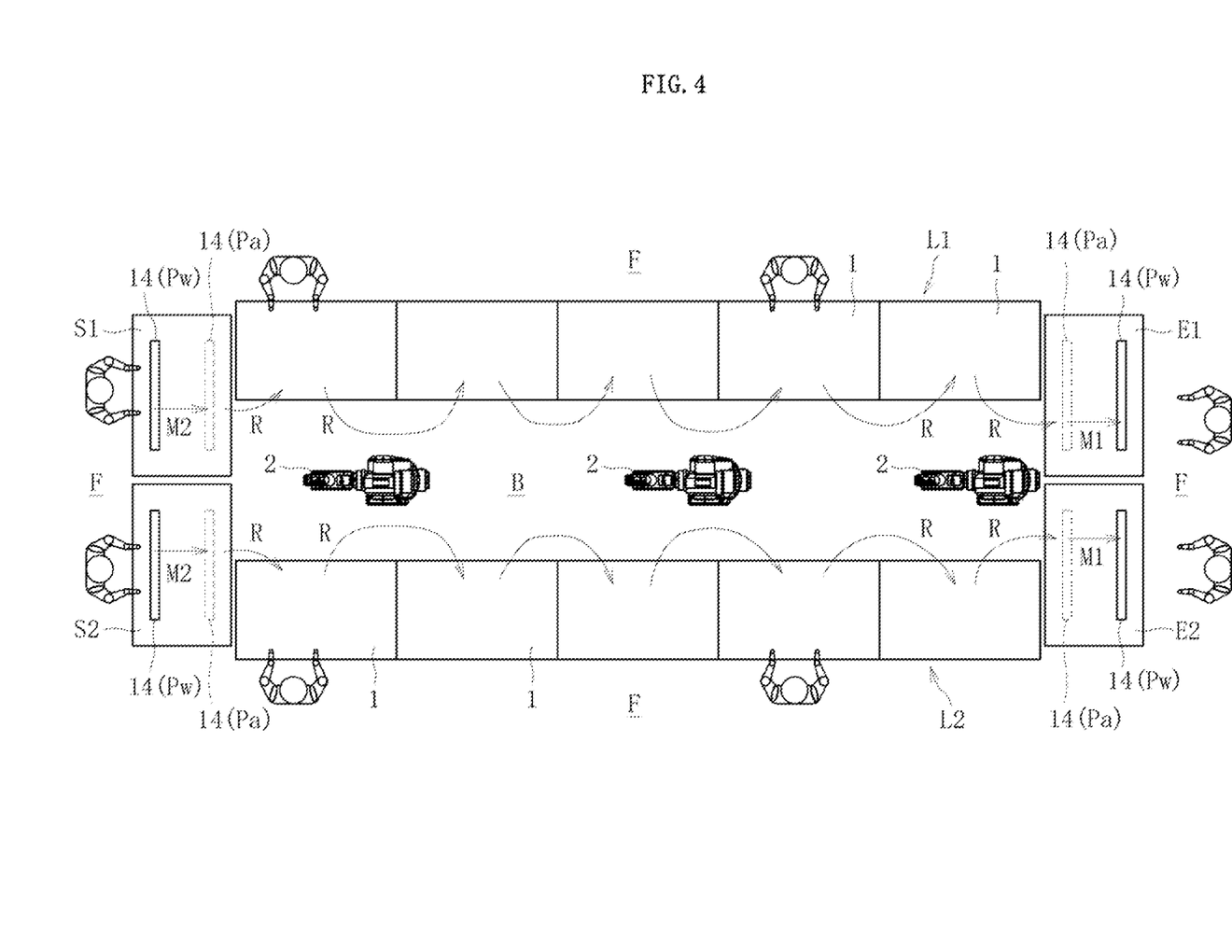
FIG. 4 is a plan view illustrating a production system according to another embodiment.

FIG. 4 is a plan view illustrating a production system according to another embodiment of the present invention. The production system is a line production system which includes a first line L1 and a second line L2 each having the production facilities 1 according to the embodiment described above aligned in a linear fashion. In the embodiment of the production system illustrated in FIG. 4, the parts identical to those of the embodiment of the production facility 1 illustrated in FIG. 1 are denoted by the same reference symbols as those in FIG. 1 to omit detailed descriptions thereof.

The production system includes the plurality of transfer robots 2 positioned between the first line L1 formed by the plurality of production facilities 1 and the second line L2 formed by the plurality of production facilities 1. The production facilities 1 except the ones on both ends of each of the lines L1, L2 are arranged with their back faced each other at a predetermined interval, and an elongated action area B of the transfer robots 2 is formed between both the lines L1, L2. Production facilities S1, S2, E1, E2 on both ends of each of the lines L1, L2 have their back faced to the direction in which each of the lines L1, L2 extends so as to close both ends of the action area B. The action area B of the transfer robot 2 and the human work area F are separated from each other by the dedicated device or casing of the production facility 1, S1, S2, E1, E2, or a dedicated partition.

In the production system, a product is fed to each of the production facilities 31, S2 positioned on the forward end of each of the lines L1, L2. The product placed on the placement part 19 by the worker of each of the production facilities S1, S2 on the forward end is sequentially conveyed to the adjacent production facility 1 as indicated by the arrow R. The product accordingly undergoes each step in each production facility 1, and the product conveyed to each of the last production facilities E1, E2 of each of the line L1, L2 is conveyed to the human work area F by the internal transfer device 13 as indicated by the arrow M1 and received by the worker.

According to the production system of this embodiment, the plurality of transfer robots 2 are arranged between the two lines L1, L2 formed by the plurality of production facilities 1, S1, S2, E1, E2, so that the action area B of the transfer robots 2 can be separated from the human work area F without separately providing a safety fence. Thus, the restoration works, the changing works, and the manual works in the production steps can be performed without stopping the transfer robots 2, to thereby increase production efficiency of each of the lines L1, L2, and reduce the size of the line production system.

In the production system of each of the embodiments described above, a predetermined production facility 1 of the plurality of production facilities 1 may be replaced by an entrance door from the human work area F to the action area B of the transfer robot 2. This allows the worker to easily going into and out of the action area B of the transfer robot 2 and the human work area F through the entrance door during the maintenance work of the transfer robot 2.

REFERENCE SIGNS LIST 1 production facility
2 transfer robot
11 casing
12 swaging device (dedicated device)
13 internal transfer device
14 placement part
Pa access position
Pw work position
B action area of transfer robot
F human work area

The invention claimed is:

1. A production facility in which a transfer robot installed on a back side of the production facility delivers a product with respect to other production facilities, the production facility comprising:
   a casing located between a front side of the production facility and the back side of the production facility, the front side of the production facility being configured as a human work area where a worker is positioned and being on the opposite side of the back side of the production facility;
   a product access position that allows at least one of reception and handoff of the product with respect to the transfer robot;
   a work position provided on a side of the product access position closer to the human work area, and at which a predetermined work is performed on the product; and
   an internal transfer device that is housed in the casing, and that transfers the product between the product access position and the work position by being driven to reciprocate linearly along a front and back direction of the production facility,
   wherein the side of the product access position closer to the human work area is set outside an action area of the transfer robot,
   wherein a human work space is formed from the human work area on the front side of the production facility to the work position,
   wherein the worker is allowed to perform a predetermined work on the production facility and the product in the human work space, and
   wherein the human work space and the action area of the transfer robot are arranged separately in the front and back direction of the production facility.

2. The production facility according to claim 1, wherein the product access position comprises:
   a first access position for receiving the product; and
   a second access position for handing off the product.

3. The production facility according to claim 1, further comprising a dedicated device housed in the casing, and for performing the predetermined work on the product transferred to the work position by the internal transfer device,
   wherein the action area of the transfer robot and the human work area are separated from each other by the dedicated device and the casing.

4. The production facility according to claim 1, further comprising a dedicated device housed in the casing, and for performing the predetermined work on the product transferred to the work position by the internal transfer device,
   wherein the internal transfer device is disposed below the dedicated device.

5. A production system, comprising a plurality of the production facilities according to claim 1,
   wherein one or plurality of the transfer robots and the plurality of the production facilities surrounding the one or the plurality of the transfer robots are arranged to form a cell production system.

6. A production system, comprising:
   a plurality of the production facilities according to claim 1;
   a first line having a part of the plurality of the production facilities aligned in a linear fashion;
   a second line opposed to the first line and having another part of the plurality of the production facilities aligned in a linear fashion; and
   a plurality of the transfer robots located between the first line and the second line.

* * * * *